(12) United States Patent
Furuya et al.

(10) Patent No.: US 9,299,975 B2
(45) Date of Patent: Mar. 29, 2016

(54) STRUCTURE FOR ATTACHING SERVICE PLUG

(71) Applicant: YAZAKI CORPORATION, Tokyo (JP)

(72) Inventors: Yoshinobu Furuya, Kakegawa (JP); Shigeyuki Ogasawara, Kakegawa (JP); Hideki Inoue, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 37 days.

(21) Appl. No.: 14/103,458

(22) Filed: Dec. 11, 2013

(65) Prior Publication Data

US 2014/0099524 A1 Apr. 10, 2014

Related U.S. Application Data

(63) Continuation of application No. PCT/JP2012/069059, filed on Jul. 20, 2012.

(30) Foreign Application Priority Data

Jul. 22, 2011 (JP) ................................. 2011-160603

(51) Int. Cl.
*H01M 2/34* (2006.01)
*H01M 2/20* (2006.01)

(52) U.S. Cl.
CPC ...... *H01M 2/34* (2013.01); *H01M 2/20* (2013.01); *H01M 2/202* (2013.01)

(58) Field of Classification Search
CPC .......... H01M 2/20; H01M 2/34; H01M 2/202
See application file for complete search history.

(56) References Cited

U.S. PATENT DOCUMENTS

2006/0183367 A1  8/2006  Saito et al.
2008/0314657 A1  12/2008  Ikeda et al.
(Continued)

FOREIGN PATENT DOCUMENTS

CN    101989670 A    3/2011
EP    2267821 A2    12/2010
(Continued)

OTHER PUBLICATIONS

International Search Report, dated Oct. 22, 2012, issued by the International Searching Authority, in counterpart Application No. PCT/JP2012/069059.
(Continued)

*Primary Examiner* — Muhammad Siddiquee
(74) *Attorney, Agent, or Firm* — Sughrue Mion, PLLC (57) ABSTRACT

A structure for attaching a service plug includes an insulating substrate that has openings facing electrodes of a pair of adjacent batteries among a plurality of batteries in a battery module, a pair of connection terminals that are respectively connected to electrodes of the pair of adjacent batteries through the insulating substrate by bolting with nuts, a pair of electric wires whose one ends are connected to the connection terminals respectively, and a connector that is connected to the other ends of the pair of electric wires, and detachably connected with the service plug. The insulating substrate has protrusions which are abutted against the connection terminals respectively, and regulate movement of the connection terminals which simultaneously rotate with rotation of the nuts respectively when being bolted with the nuts.

10 Claims, 6 Drawing Sheets

(56) References Cited

U.S. PATENT DOCUMENTS

| | | |
|---|---|---|
| 2009/0325060 A1 | 12/2009 | Komaki et al. |
| 2010/0323236 A1* | 12/2010 | Kosaki et al. ............ 429/159 |
| 2011/0008669 A1 | 1/2011 | Ogasawara et al. |
| 2011/0027634 A1 | 2/2011 | Kishimoto et al. |
| 2011/0159336 A1* | 6/2011 | Ohkura et al. ............ 429/99 |
| 2012/0003507 A1 | 1/2012 | Krieg |
| 2012/0231640 A1* | 9/2012 | Ikeda et al. ............ 439/110 |

FOREIGN PATENT DOCUMENTS

| | | |
|---|---|---|
| EP | 2290733 A1 | 3/2011 |
| JP | 09-106801 A | 4/1997 |
| JP | 2000-277069 A | 10/2000 |
| JP | 2002-343331 A | 11/2002 |
| JP | 2006-222043 A | 8/2006 |
| JP | 2006-269103 A | 10/2006 |
| JP | 2007-317400 A | 12/2007 |
| JP | 2009-152135 A | 7/2009 |
| JP | 2010-009991 A | 1/2010 |
| JP | 2010-262756 A | 11/2010 |
| JP | 2012-520540 A | 9/2012 |
| WO | 2011/043261 A1 | 4/2011 |

OTHER PUBLICATIONS

Written Opinion, dated Oct. 22, 2012, issued by the International Seaching Authority, in counterpart Application No. PCT/JP2012/069059.

Office Action dated Apr. 8, 2015 issued by the Canadian Intellectual Property Office in corresponding Application No. 2,838,320.

Office Action from the State Intellectual Property Office of the People's Republic of China. Dated Jun. 3, 2015 in counterpart Application No. 201280036401.1.

Communication from the Japanese Patent Office dated Mar. 18, 2015 in a counterpart Japanese application No. 2011-160603.

* cited by examiner

STRUCTURE FOR ATTACHING SERVICE PLUG

CROSS REFERENCE TO RELATED APPLICATIONS

This application is a continuation of PCT application No. PCT/JP2012/069059, which was filed on Jul. 20, 2012 based on Japanese Patent Application (No. P2011-160603) filed on Jul. 22, 2011, the contents of which are incorporated herein by reference.

BACKGROUND OF THE INVENTION

1. Field of the Invention

The present disclosure relates to a structure for attaching a service plug, and more particularly to a structure for attaching a service plug that opens and closes a power circuit of a battery module having a plurality of batteries connected in series.

2. Description of the Related Art

For example, JP-A-2002-343331 has proposed that when a battery module having a plurality of batteries connected in series is used in a power supply for driving an automobile, a series connection of a pair of positive and negative electrodes of the adjacent batteries is opened in advance, and a service plug is detachably connected between those electrodes. The service plug is removed therefrom when the battery module is maintained (when a service person conducts maintenance of the battery module), or an electronic device that is a load of the battery module is maintained, and a main circuit of the battery module is broken to ensure safety. In particular, in JP-A-2002-343331, a receiving terminal is fitted to each of the positive electrode and the negative electrode whose series connection is opened, and the service plug is detachably attached to the receiving terminals.

However, in JP-A-2002-343331, since the service plug is directly attached to the receiving terminals of the battery module, the battery module must be installed at a position where the service plug can be detachably attached. Also, there arises such a problem that a shape of the service plug is restricted due to the position where the service plug is attached.

On the other hand, JP-A-2009-152135 has proposed that in a battery pack having a plurality of battery modules connected in series in which each battery module has a plurality of batteries connected in series, because the service plug is arranged at an easy-to-work position, an electric wire is connected to each of a positive electrode and a negative electrode of the adjacent battery module, an outlet is connected to a tip of each electric wire, and each outlet is fixed at a desired position where the service plug is detachably fixed.

SUMMARY OF THE INVENTION

Incidentally, as disclosed in JP-A-2009-152135, when the electric wires are connected to the respective electrodes, each electrode is connected to the electric wire through a terminal. In this case, the terminal connected with the electric wire is located at a desired position, and the terminal is connected to the electrode by bolting while the terminal is so restrained as not to be moved. However, JP-A-2009-152135 does not take a work for connecting the terminal to the electrode into account, and remains a matter of an improvement in the workability.

An object of the present disclosure is to improve the workability of connecting each terminal to the electrode to be connected with the service plug.

In order to solve the above problem, according to the present disclosure, there is provided a structure for attaching a service plug which closes or opens a connection between a pair of adjacent batteries among a plurality of batteries in a battery module in which the batteries are arranged so that positive electrodes and negative electrodes of the batteries are alternately arranged, and the positive electrodes and the negative electrodes of the adjacent batteries being connected to each other by conductors, the structure comprising: an insulating substrate that has openings facing the electrodes of the pair of adjacent batteries; a pair of connection terminals that are respectively connected to the electrodes of the pair of adjacent batteries through the insulating substrate by bolting with nuts; a pair of electric wires whose one ends are connected to the connection terminals respectively; and a connector that is connected to the other ends of the pair of electric wires, and detachably connected with the service plug, wherein the insulating substrate has protrusions which are abutted against the connection terminals respectively, and regulate movement of the connection terminals which simultaneously rotate with rotation of the nuts respectively when being bolted with the nuts.

According to the above configuration, when the pair of connection terminals for connecting the service plug is connected to the positive electrode and the negative electrode of the pair of adjacent batteries, even if the respective terminals are not held by a hand or the like for the purpose of preventing the simultaneous rotation, the protrusions are abutted against the respective terminals so as to prevent the simultaneous rotation of the respective terminals. Therefore, the workability of connecting the terminals to the electrodes of the battery connected with the service plug can be improved.

For example, the protrusions are walls which are provided so as to face each other at a distance corresponding to a width of each of the connection terminals, and each of the connection terminals is arranged on a space between the walls. As a result, since the respective terminals are abutted against the walls so as to stop the simultaneous rotation even if the respective terminals are going to rotate simultaneously with the nuts by bolting, the simultaneous rotation of the respective terminals can be prevented.

For example, ribs are protruded from facing surfaces of the walls, and the connection terminals are arranged between the ribs and an installation surface of the insulating substrate where the connection terminals are installed. According to this configuration, even if the respective terminals are going to be escaped from the space between the walls by some external force, since the ribs are abutted against the respective terminals so as to prevent the respective terminals from being escaped, the workability of connecting the terminals to the electrodes of the battery can be further improved.

For example, a protrusion to be engaged with a slit formed in each of the connection terminals is provided on at least one of the insulating substrate and the walls. According to this configuration, when the slit of each of the terminals is engaged with the protrusion, the terminals can be positioned, and the terminals can be prevented from moving away from the insulating substrate. Therefore, the workability of connecting the terminals to the electrodes of the battery can be still further improved.

According to the present disclosure, the workability of connecting each terminal to the electrode to be connected with the service plug can be improved.

DETAILED DESCRIPTION OF THE EXEMPLARY EMBODIMENTS

Hereinafter, an embodiment of the present disclosure will be described. As illustrated in FIGS. 1 to 6, a battery module 3 to which a service plug 1 is fixed according to this embodiment is configured such that positive electrodes and negative electrodes of a plurality of batteries 5 are alternately arranged, and the positive electrodes and the negative electrodes of the adjacent batteries 5 are connected to each other by a plurality of conductors, for example, a plurality of busbars. For example, a threaded columnar terminal portion 7 is protruded from each of the positive electrode and the negative electrode of each battery 5. The plurality of busbars is each housed and fixed in a busbar module 9. Each of the busbars is formed with a pair of insertion holes into which a pair of the terminal portions 7 of the adjacent batteries 5 is inserted. The terminal portions 7 are inserted into the respective insertion holes, and the positive electrode and the negative electrode of the adjacent batteries 5 are connected to each other by bolting with screwed nuts.

Figure 1:
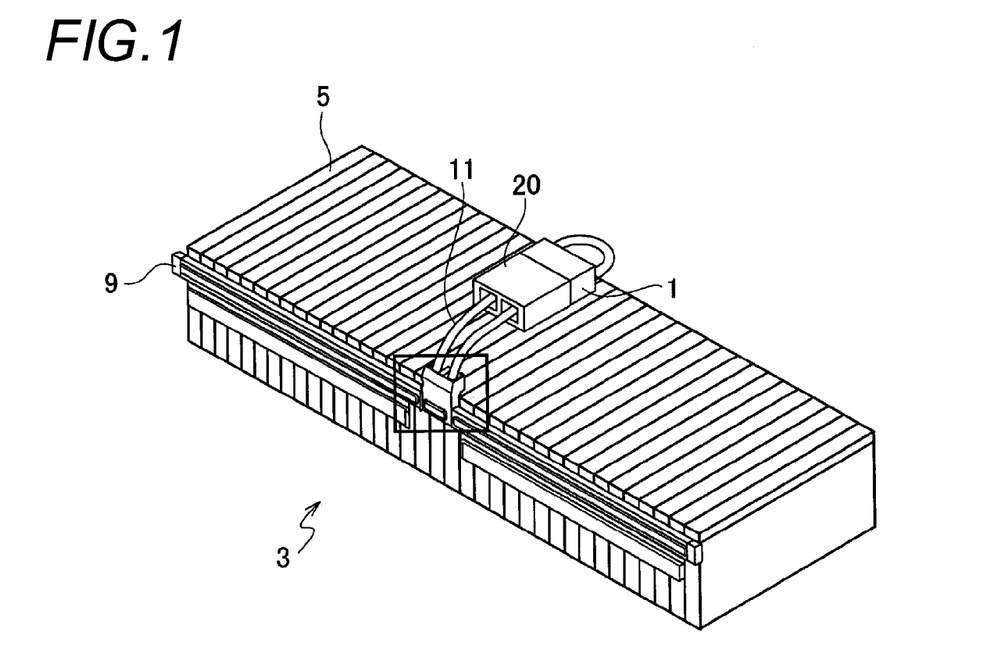
FIG. 1 is a perspective view of a battery module to which a service plug is attached by an attaching structure for attaching the service plug according to an embodiment of the present disclosure.
Figure 2:
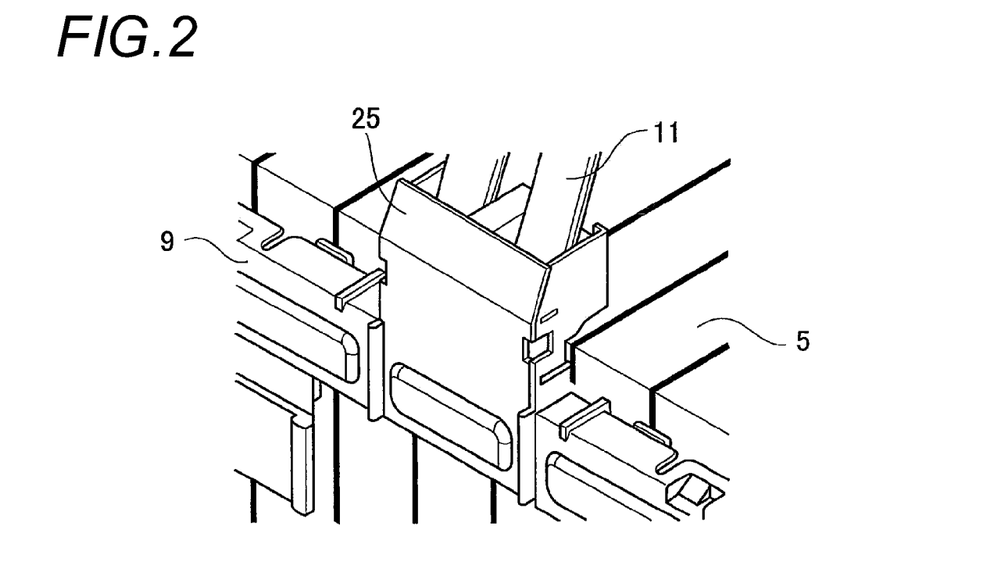
FIG. 2 is an enlarged diagram of a portion of the attaching structure surrounded by a square in FIG. 1.

A positive terminal portion and a negative terminal portion 7 of the pair of batteries 5 among the adjacent batteries 5 in the battery module 3 are not connected to each other by the busbar, but opened. The terminal portions 7 in an opened state are openably connected to each other by the service plug 1. With the above configuration, when the battery module 3 is maintained, or the electronic device which is a load of the battery module 3 is maintained, the service plug 1 for maintenance is removed to shut off a power circuit of the battery module 3 so as to ensure the safety of the work.

Figure 4:
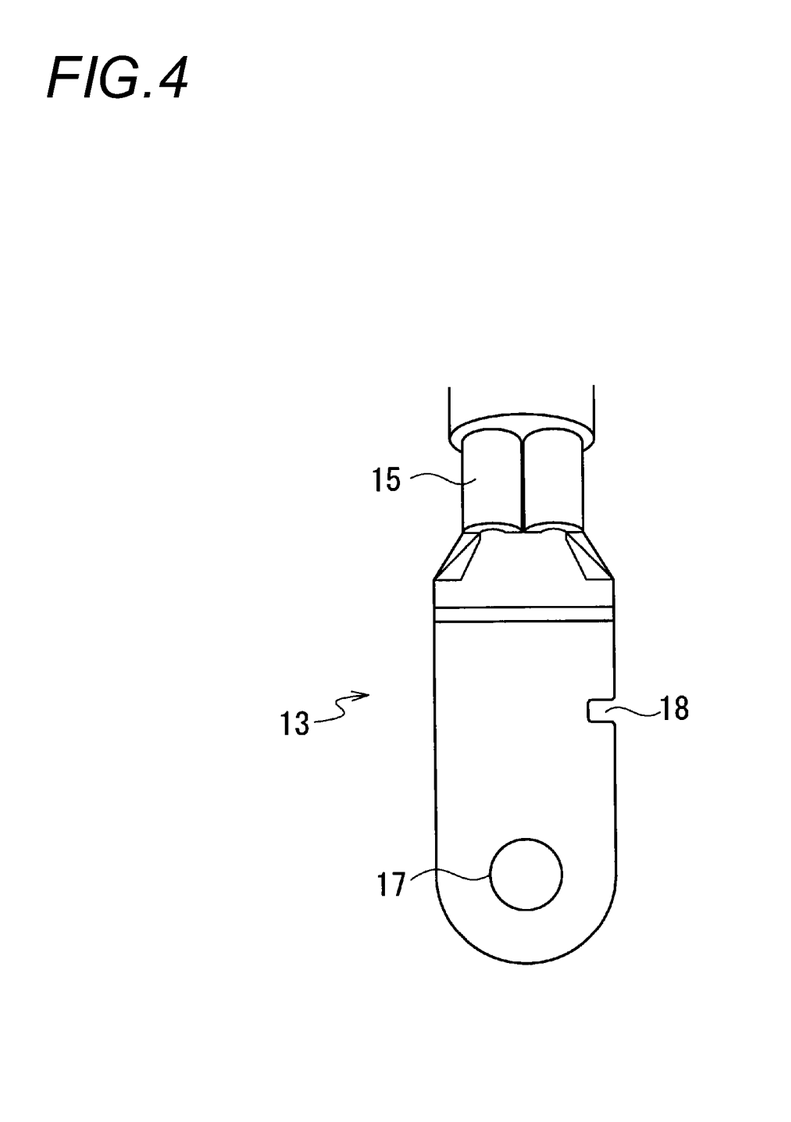
FIG. 4 is a plan view of a terminal to be connected to an electrode in FIG. 3.
Figure 5:
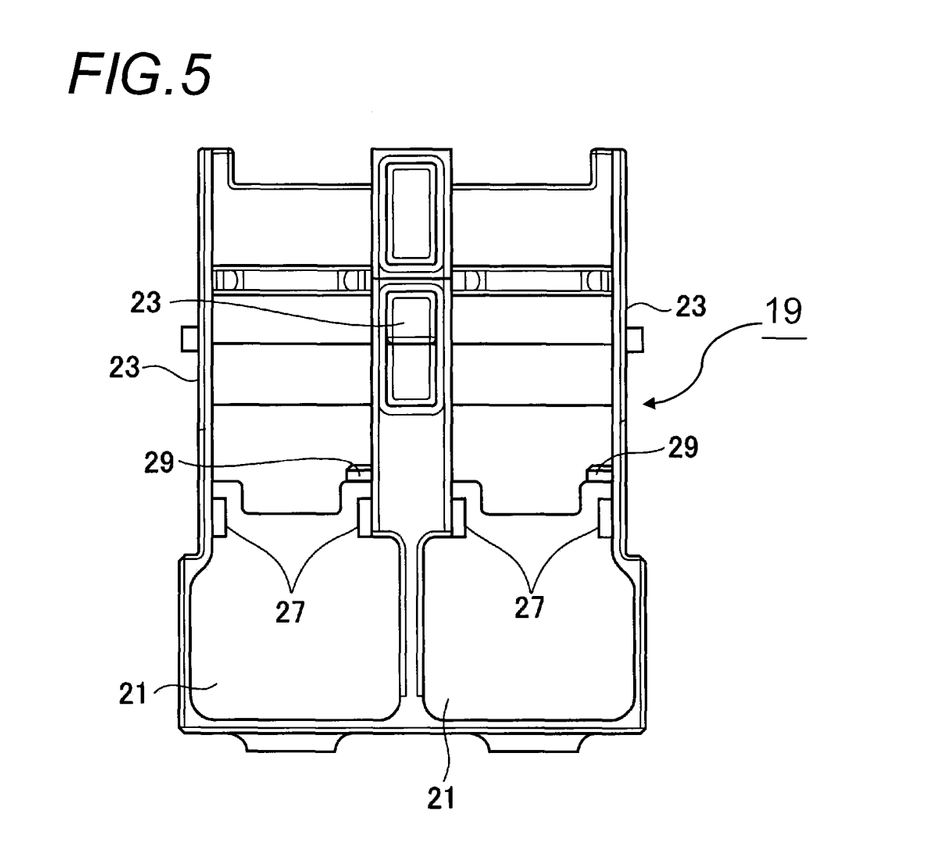
FIG. 5 is a plan view of an insulating substrate in FIG. 3.
Figure 6:
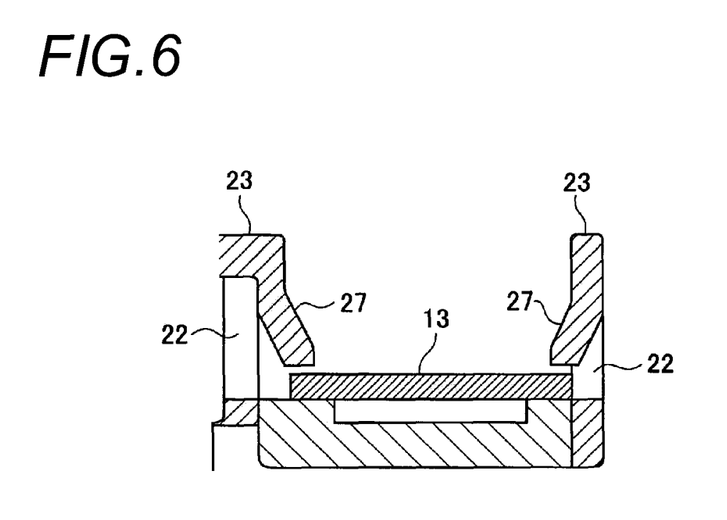
FIG. 6 is a cross-sectional view of the attaching structure at a position of a rib in FIG. 2.

Now, a structure for attaching the service plug 1 which is a feature of this embodiment will be described. Each of the terminal portions 7 in the opened state is connected with a pair of terminals connected with an electric wire 11, for example, a pair of round plate terminals (hereinafter referred to as "connection terminals") 13. As shown in FIG. 4, each of the connection terminals 13 has one end formed with an electric wire connection portion 15 connected with the electric wire 11. The connection terminal 13 has the other end formed with an insertion hole 17 into which the terminal portion 7 is inserted, and a side portion formed with a slit 18. The other ends of the pair of electric wires 11 are equipped with a connector 20 to which the service plug 1 is detachably connected. The service plug 1 is attached to the connector 20 to perform electric conduction between the pair of electric wires 11. The service plug 1 is detached from the connector 20 to cut off the electric conduction between the pair of electric wires 11. As a result, when the service plug 1 is attached to the connector 20, the power circuit of the battery module 3 is shut off. With the above configuration, for example, after the service plug 1 is detached from the connector 20 so that no high voltage flows into the battery module 3, the maintenance work of the battery module 3 can be conducted, and the safety of the work can be ensured.

Each of the connection terminals 13 is arranged on, for example, an insulating substrate 19 made of resin, and connected to each of the terminal portions 7 by bolting in a state that each of the connection terminals 13 is arranged on the insulating substrate 19. A metal washer 24 is disposed between each of connection terminals 13 and each of nuts 26.

Figure 3:
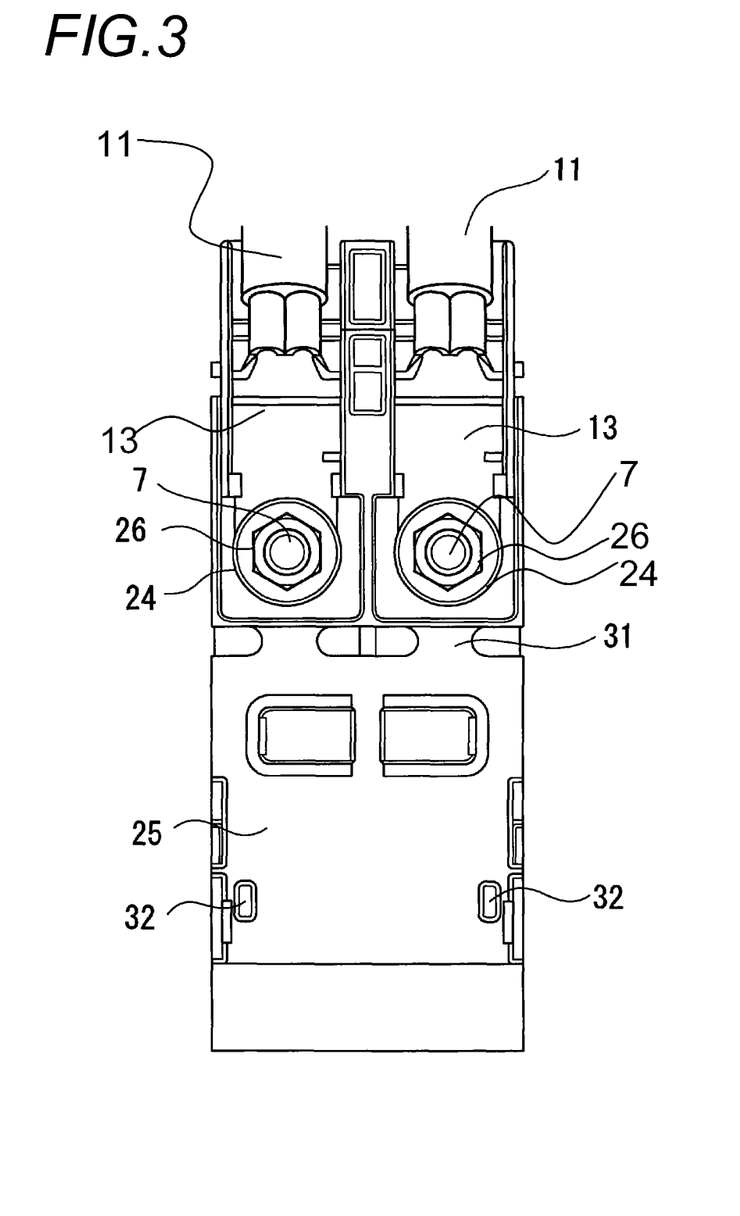
FIG. 3 is a plan view illustrating a state in which a cover of the attaching structure in FIG. 2 is opened.

The insulating substrate 19 includes a pair of adjacent openings 21, a plurality of walls 23 that serve as protrusions to be abutted against the connection terminals 13 for regulating the simultaneous rotation of each connection terminal 13 with the nuts 26 when being bolted, and an openable cover 25. The pair of openings 21 is formed along an arrangement direction of the pair of terminal portions 7, and each terminal portion 7 is inserted into each opening 21. The plurality of (three in this embodiment) walls 23 faces each other at distances corresponding to a width of the connection terminals 13, and erect on the insulating substrate 19. Each of the walls 23 is made of the same insulating resin as that of the insulating substrate 19, and each of the connection terminals 13 is inserted between the respective walls 23. A tongue-shaped rib 27 configured by cutting and lifting a part of each wall 23 from a base side thereof is formed on each facing surface of the walls 23. An opening 22 corresponding to each rib 27 is formed at a position where the rib 27 of each wall 23 is formed. A gap into which each connection terminal 13 can be inserted is formed between a tip of each rib 27 and the insulating substrate 19. Also, a ridge portion 29 is formed at a position corresponding to the slit 18 of the connection terminal 13 of each wall 23. The ridge portion 29 is a protrusion and can be engaged with the slit 18. The ridge portion 29 is formed along a height direction of each wall 23. As illustrated in FIG. 3, the cover 25 includes a hinge portion 31 and a convex portion 32 that is engaged with a concave portion of the wall 23, and each space between the walls 23 where the connection terminal 13 is arranged is opened or closed by the cover 25.

Figure 7:
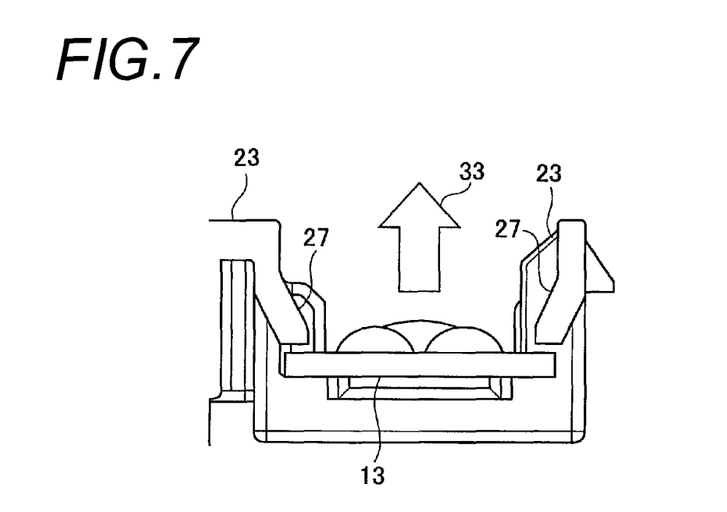
FIG. 7 is a cross-sectional view of the attaching structure at the position of the rib in FIG. 2, taken toward an electric wire side.
Figure 8:
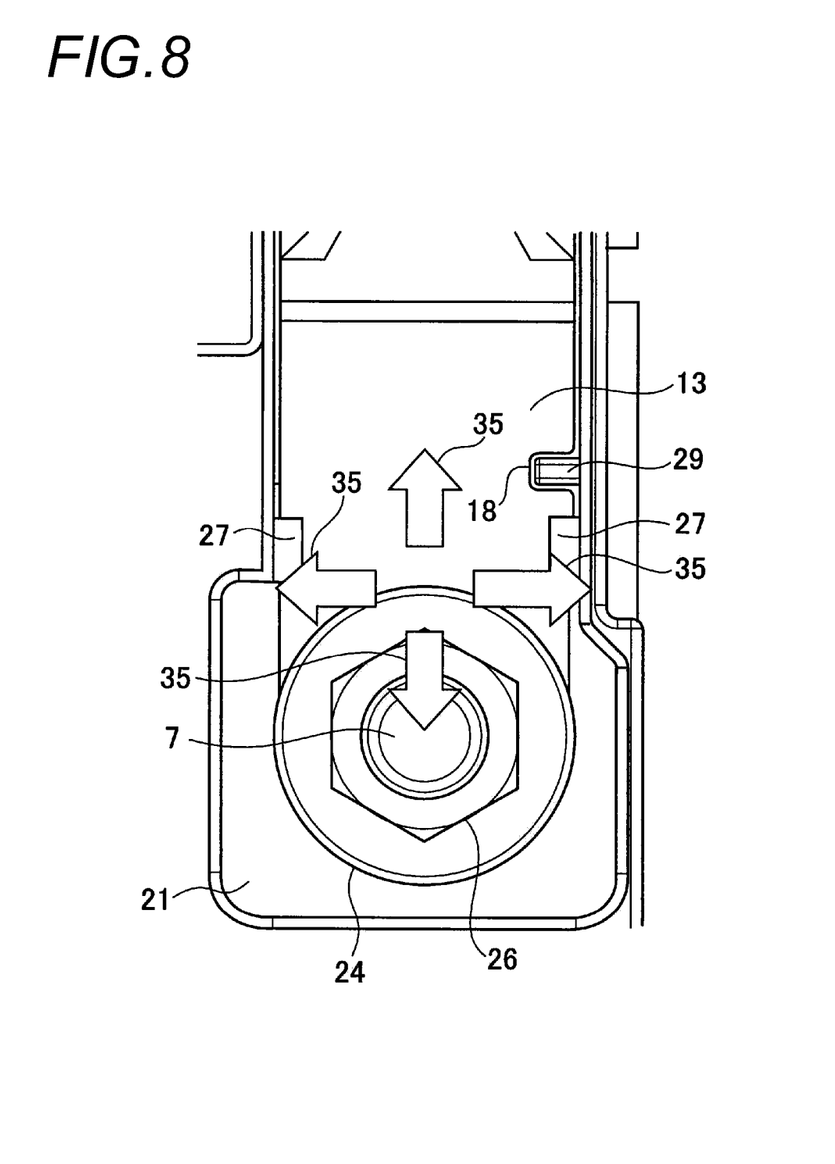
FIG. 8 is a plan view illustrating a state in which a protrusion shown in FIG. 2 is engaged with the terminal.

A work of attaching the service plug 1 thus configured according to this embodiment will be described. The insulating substrate 19 on which the pair of connection terminals 13 is arranged is disposed at the positions of the pair of terminal portions 7 in the opened state in the busbar module 9. In other words, the insulating substrate 19 where the pair of connection terminals 13 is arranged is formed on one portion of a plurality of busbar fixing portions of the busbar module 9. Each of the connection terminals 13 is inserted between the walls 23 erected on the insulating substrate 19 from above. In this situation, the slit 18 of each of the connection terminals 13 is positioned so as to be engaged with the ridge portion 29 of each wall 23 whereby each connection terminal 13 is inserted into a given position while being guided by the ridge portion 29. When each of the connection terminals 13 is inserted between the walls 23, each of the ribs 27 is abutted against the side portion of each of the connection terminals 13. In this state, when each of the connection terminals 13 is pushed into between the walls 23, each of the ribs 27 is elastically deformed, each of the ribs 27 enters into each of the opening 22, as a result the distance between the facing ribs 27 is widened. When each of the connection terminals 13 passes through the tip of each of the ribs 27, each of the ribs 27 is returned to an original position due to elasticity thereof. As a result, even if as each of the connection terminals 13 travels so as to be escaped from a space between the walls 23 (in a direction of arrow 33), since the rib 27 is abutted against the connection terminal 13, the connection terminal 13 can be prevented from escaping from the space between the respective walls 23 as shown in FIG. 7. Also, since the slit 18 of each of the connection terminals 13 is engaged with the ridge portion 29 of the wall 23, the connection terminals 13 can be positioned at a desired position. Also, as illustrated in FIG. 8, a movement of the connection terminal 13 in a direction (direction of arrow 35) of detachment along the insulating substrate 19 can be regulated. The connection terminals 13 are fixed to the insulating substrate 19 by the ribs 27 and the ridge portions 29.

In this state, when the busbar module 9 is located to be positioned to the terminal portions 7 of the respective batteries 5, the pair of terminal portions 7 is inserted into the openings 21 of the insulating substrate 19, and protruded from insertion holes 17 of the respective connection terminals 13. In this situation, even if each of the connection terminals 13 is going to move above from the insulating substrate 19 by an insertion force of the terminal portion 7, the ribs 27 are abutted against each of the connection terminals 13 so that each of the connection terminals 13 can be prevented from escaping from spaces between the respective walls 23. Then, each of the terminal portions 7 is fastened by the nut 26 through the metal washer 24. In this situation, even if each of the connection terminals 13 is going to rotate with each of the nuts 26 simultaneously by a fastening force of each of the nuts 26, since each of the connection terminals 13 is sandwiched and fixed between the respective walls 23, the simultaneous rotation of each of the connection terminals 13 with each of the nuts 26 can be prevented even if each of the connection terminals 13 is not held by a hand or the like. As a result, the respective connection terminals 13 are connected to the pair of terminal portions 7 in the opened state through the insulating substrate 19. After completion of the connection of the respective connection terminals 13, the cover 25 is closed so that the terminal portions 7 and the connection terminals 13 can be protected. Then, the service plug 1 is attached to the connector 20 which is connected with the other ends of the pair of electric wires 11 connected to the respective connection terminals 13 to perform electric conduction between the pair of electric wires 11. As a result, the electric conduction between the pair of terminal portions 7 in the opened state is performed to connect all of the batteries 5 in series.

Thus, according to this embodiment, the terminal portion 7 of each of the batteries 5 and each of the connection terminals 13 are fastened together by bolting, the walls 23 are abutted against the connection terminals 13 so that the simultaneous rotation of the connection terminals 13 can be prevented. Therefore, there is no need to hold the connection terminals 13 by the hand or the like, and the connection terminals 13 can be easily connected to the terminal portions 7 of the batteries 5. As a result, the workability of connecting the terminal portion 7 of each of the batteries 5 to the service plug 1 through the electric wire 11 connected to the connection terminal 13 can be improved.

Also, in this embodiment, since the connector 20 attached with the service plug 1 floats without being fixed to the battery module 3, there is no need to additionally provide the structure for attaching the connector 20, and the structure of the battery module 3 can be simplified. Although the structure becomes complicated, the structure for attaching the connector 20 to the battery module 3 can be applied.

Also, the ribs 27 that are abutted against each of the connection terminals 13 can be omitted. However, the ribs 27 make it possible to prevent the connection terminal 13 from moving in the insertion direction of the terminal portion 7. Therefore, the ribs 27 facilitate the work of connecting the connection terminals 13 to the terminal portions 7.

Also, each of the ridge portions 29 on the insulating substrate 19 is engaged with the slit 18 of each of the connection terminals 13. However, the slits 18 and the ridge portions 29 can be omitted. However, with the application of the structure in which each of the ridge portions 29 is engaged with the slit 18 of each of the connection terminals 13, each of the connection terminals 13 is fixed to the insulating substrate 19. Therefore, even if the electric wire 11 is pulled during work, each of the connection terminals 13 can be prevented from dropping out of the insulating substrate 19. The ridge portions 29 to be engaged with the slits 18 can be formed on at least one of the insulating substrate 19 and the wall 23.

Also, in this embodiment, as the protrusions that regulate the simultaneous rotation of the respective connection terminals 13 with the nuts 26 when being bolted, the walls 23 are erected to face each other at the distances corresponding to the width of the respective connection terminals 13. However, the protrusions that regulate the simultaneous rotation are not limited to the plurality of walls 23. In short, if the protrusions can be appropriately selected if the protrusions are abutted against the respective connection terminals 13 to regulate the simultaneous rotation when being bolted.

The terminal to be connected to the terminal portion 7 of each of the batteries 5 is not limited to the connection terminal 13, but a terminal having one end connectable to the terminal portion 7 of each of the batteries 5, and the other end connectable to the electric wires 11 can be appropriately selected.

Also, the pair of openings into which the terminal portions 7 of the batteries 5 are inserted needs to be formed to face the terminal portions 7, and is not limited to the configuration of this embodiment.

Also, the insulating substrate 19 can be integrated with the busbar module 9, or engaged or coupled with the busbar module 9 to provide the insulating substrate 19 on the busbar module 9. Also, the insulating substrate 19 is engaged or coupled with the two busbar modules 9 so that the insulating substrate 19 can be supported by those two busbar modules 9. Also, the insulating substrate 19 and the busbar module 9 can be mounted, separately.

Also, the ribs 27 are not limited to the tongue shape, but can be appropriately selected. In short, there can be applied a structure in which the ribs 27 are projected from the facing surfaces of the walls 23 and abutted against the connection terminal 13 so as to regulate the escape of the connection terminal 13 from the space between the walls 23.

By the above configuration in the present disclosure, the workability of connecting each terminal to the electrode to be connected with the service plug can be achieved.

What is claimed is:

1. A structure for attaching a service plug which closes or opens a connection between a pair of adjacent batteries among a plurality of batteries in a battery module in which the batteries are arranged so that positive electrodes and negative electrodes of the batteries are alternately arranged, and the positive electrodes and the negative electrodes of the adjacent batteries being connected to each other by conductors, the structure comprising:
   an insulating substrate having openings facing the electrodes of the pair of adjacent batteries;

a pair of connection terminals respectively connected to the electrodes of the pair of adjacent batteries through the openings in the insulating substrate by bolting with nuts;

a pair of electric wires whose one ends are connected to the connection terminals respectively; and a connector connected to the other ends of the pair of electric wires, and detachably connected with the service plug, wherein the insulating substrate further comprises walls provided so as to face each other at a distance corresponding to a width of each of the connection terminals, the walls abutting against the connection terminals respectively, and regulating movement of the connection terminals which simultaneously rotate with rotation of the nuts respectively when being bolted with the nuts wherein each of the connection terminals are arranged in a space between the walls, and wherein ribs protrude from facing surfaces of the walls, and the connection terminals are arranged between the ribs and an installation surface of the insulating substrate where the connection terminals are installed.

2. The structure for attaching a service plug according to claim 1, wherein a protrusion configured to be engaged with a slit formed in each of the connection terminals is provided on at least one of the insulating substrate and the walls.

3. A structure for attaching a service plug which closes or opens a connection between a pair of adjacent batteries among a plurality of batteries in a battery module in which the batteries are arranged so that positive electrodes and negative electrodes of the batteries are alternately arranged, and the positive electrodes and the negative electrodes of the adjacent batteries being connected to each other by conductors, the structure comprising:

an insulating substrate comprising openings facing respective electrodes of the pair of adjacent batteries;

a pair of connection terminals connected to the respective electrodes of the pair of adjacent batteries through the respective openings of the insulating substrate by bolting with respective nuts;

a pair of electric wires whose first ends are connected to respective connection terminals of the pair of connection terminals; and a connector connected to second ends of the pair of electric wires, and detachably connected with the service plug, wherein the insulating substrate further comprises walls that protrude from the insulating substrate, abut the connection terminals, and prevent the connection terminals from rotating with a rotation of the respective nuts when being bolted with the respective nuts, wherein the pair of connection terminals comprise respective slits, and wherein at least one of the insulating substrate and the walls comprise a protrusion configured to be engaged with the respective slits formed in the pair of connection terminals.

4. A structure for attaching a service plug which closes or opens a connection between a pair of batteries, the structure comprising:

an insulating substrate comprising respective openings configured to face respective electrodes of the pair of batteries;

a pair of connection terminals configured to be connected to the respective electrodes of the pair of adjacent batteries through the respective openings of the insulating substrate by bolting with respective nuts;

a pair of electric wires comprising respective first ends and second ends, the first ends being connected to respective connection terminals of the pair of connection terminals; and a connector connected to the second ends of the pair of electric wires, and configured to be connected to the service plug, wherein the insulating substrate further comprises walls provided so as to face each other at a distance corresponding to a width of each of the connection terminals, the walls being configured to abut the connection terminals and prevent the connection terminals from rotating with a rotation of the respective nuts when being bolted with the respective nuts, wherein each of the connection terminals is arranged in a space between the walls, wherein ribs protrude from facing surfaces of the walls, and the connection terminals are arranged between the ribs and an installation surface of the insulating substrate where the connection terminals are installed, wherein the second ends of the pair of electric wires are electrically connected by the service plug when the connector is connected to the service plug, and, wherein the respective the second ends of the pair of electric wires are not electrically connected by the service plug when the connector is not connected to the service plug.

5. The structure for attaching a service plug according to claim 1, wherein the electrodes of the pair of adjacent batteries are inserted into the opening of the insulating substrate;

wherein the protrusions formed on the insulating substrate abut against side edges of the connection terminals when being bolted with the nuts; and wherein the side edges of the connection terminals are arranged between hole portions of the connection terminal through which the electrodes are inserted and end portions of the connection terminals which connect the pair of the electric wires.

6. The structure for attaching a service plug according to claim 1, wherein the ribs are configured to elastically deform when the connection terminals inserted in between the ribs.

7. The structure for attaching a service plug according to claim 1, wherein the ribs are configured to prevent the connection terminals from exiting the space formed between the protrusions.

8. A battery module comprising:

a plurality of batteries arranged so that positive electrodes and negative electrodes of the plurality of batteries are alternately arranged, the positive electrodes and the negative electrodes of the adjacent batteries being connected to each other by conductors;

a service plug configured to close or open a connection between a pair of adjacent batteries among the plurality of batteries:

an insulating substrate comprising respective openings facing respective electrodes of the pair of adjacent batteries;

a pair of connection terminals connected to the respective electrodes of the pair of adjacent batteries through the respective openings of the insulating substrate by bolting with respective nuts;

a pair of electric wires comprising respective first ends and second ends, the first ends being connected to respective connection terminals of the pair of connection terminals; and a connector connected to the second ends of the pair of electric wires, and configured to be connected to the service plug, wherein the insulating substrate further comprises protrusions configured to abut the connection terminals and prevent the connection terminals from rotating with a rotation of the respective nuts when being bolted with the respective nuts, wherein the second ends of the pair of electric wires are electrically connected by the service plug when the connector is connected to the service plug, wherein the respective the second ends of the pair of electric wires are not electrically connected by the service plug when the connector is not connected to the service plug, wherein the connector is connected to the battery module only through the pair of electric wires, wherein the protrusions comprise walls extending from the insulating surface and provided so as to face each other at a distance corresponding to a width of each of the connection terminals, and wherein ribs protrude from facing surfaces of the walls, and the connection terminals are arranged between the ribs and an installation surface of the insulating substrate where the connection terminals are installed.

9. The battery module according to claim 8 wherein each of the connection terminals are arranged in a space between the walls and abutting against the walls.

10. The battery module according to claim 8 wherein each of the connection terminals are arranged in a space between the walls and abutting against the walls, and wherein the pair of connection terminals comprise respective slits, and wherein at least one of the insulating substrate and the walls comprise a protrusion configured to be engaged with the respective slits formed in the pair of connection terminals.

* * * * *